US006537408B1

(12) United States Patent
Rossiter

(10) Patent No.: US 6,537,408 B1
(45) Date of Patent: Mar. 25, 2003

(54) METHOD AND APPARATUS TO SECURE A REINFORCED FLEXIBLE MATERIAL ABOUT THE OPEN END OF A CONTAINER

(76) Inventor: David Rossiter, 209 Garrison Chase, Senoia, GA (US) 30276

( * ) Notice: Subject to any disclaimer, the term of this patent is extended or adjusted under 35 U.S.C. 154(b) by 0 days.

(21) Appl. No.: 09/946,107

(22) Filed: Sep. 4, 2001

(51) Int. Cl.[7] .................................. B32B 31/00

(52) U.S. Cl. .................. 156/212; 156/215; 156/227; 156/249; 383/127

(58) Field of Search .................... 156/212, 215, 156/216, 227, 247, 249; 383/11, 33, 127

(56) References Cited

U.S. PATENT DOCUMENTS

| | | | | |
|---|---|---|---|---|
| 2,241,309 | A | | 5/1941 | Kovalik |
| 2,585,214 | A | | 2/1952 | Belmont |
| 3,148,799 | A | * | 9/1964 | Meroney |
| 3,300,082 | A | * | 1/1967 | Patterson |
| 4,008,851 | A | * | 2/1977 | Hirsch |
| 4,027,774 | A | * | 6/1977 | Cote |
| 4,509,570 | A | | 4/1985 | Eby et al. |
| 4,535,911 | A | * | 8/1985 | Goulter |
| 4,558,800 | A | * | 12/1985 | Isgar et al. |
| 4,589,570 | A | * | 5/1986 | Auten |
| 4,611,350 | A | | 9/1986 | Kaczerwaski |
| 4,747,701 | A | * | 5/1988 | Perkins |
| 4,792,241 | A | | 12/1988 | Broderick et al. |
| 4,867,340 | A | * | 9/1989 | Byers |
| 4,892,223 | A | * | 1/1990 | DeMent |
| 4,938,607 | A | | 7/1990 | Kelley |
| 4,953,704 | A | | 9/1990 | Cortese |
| 5,028,022 | A | | 7/1991 | Metcalf |
| 5,078,508 | A | | 1/1992 | Johan et al. |
| 5,133,607 | A | | 7/1992 | Bonke |
| 5,232,118 | A | | 8/1993 | Samuel |
| 5,611,507 | A | * | 3/1997 | Smith |
| 5,695,088 | A | | 12/1997 | Kasbohm |
| 5,911,335 | A | | 6/1999 | Baumann |
| 5,913,606 | A | * | 6/1999 | Nicholson |
| 6,003,717 | A | * | 12/1999 | Long |
| 6,029,844 | A | | 2/2000 | Brady |
| 6,164,824 | A | | 12/2000 | McGlew |
| 6,199,803 | B1 | | 3/2001 | Schafer |

FOREIGN PATENT DOCUMENTS

| | | | |
|---|---|---|---|
| DE | 296 03 372 | * | 6/1996 |
| WO | 95/11181 | * | 4/1995 |

* cited by examiner

*Primary Examiner*—Curtis Mayes
(74) *Attorney, Agent, or Firm*—Patent Focus, Inc.; Richard C. McComas

(57) ABSTRACT

Securing a flexible material about the open end of a container. A securing mechanism pre-attached or separately attached to the flexible material is a single user operated securing mechanism visible to the user while securing the flexible material about the open end of a container. A portion of the flexible material, positioned about the open end of the container, is folded in a single or plurality of layers. The folded portion is positioned adjacent to the un-folded portion of the flexible material. The securing mechanism secures the folded portion to the un-folded portion thereby securing the flexible material about the open end of the container. The flexible material may, if desired, be reinforced along one edge. The reinforced area, disposed on the flexible material, prevents inadvertent tearing or ripping of the flexible material.

3 Claims, 2 Drawing Sheets

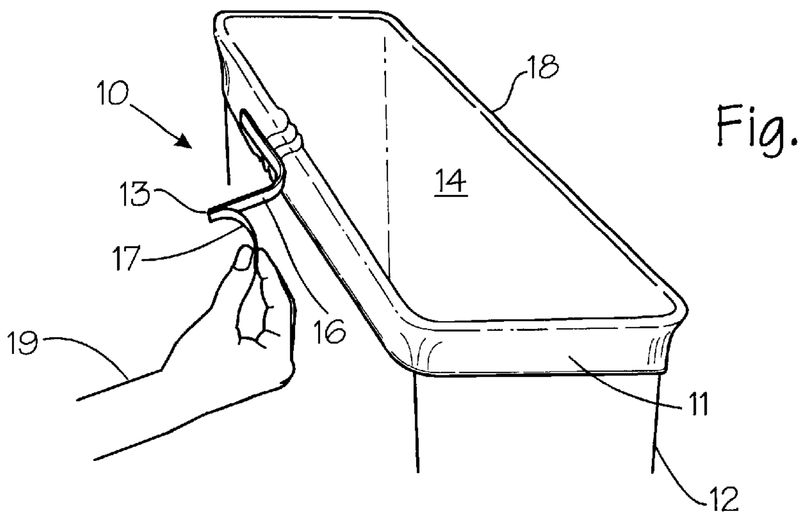
Fig. 1
Fig. 2
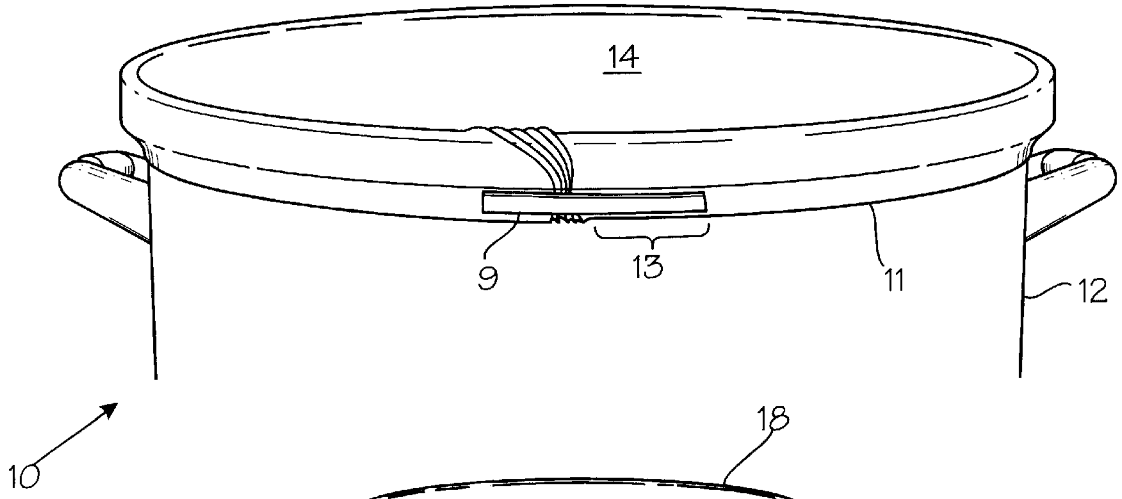
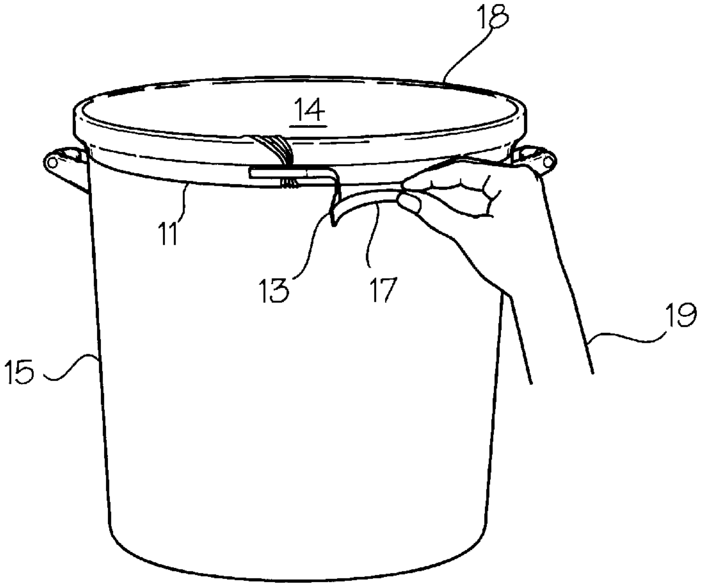
Fig. 3

METHOD AND APPARATUS TO SECURE A REINFORCED FLEXIBLE MATERIAL ABOUT THE OPEN END OF A CONTAINER

FILED OF THE INVENTION

The invention relates, in general, to securing a flexible material about a container's open end. In particular, the invention relates to a securing mechanism attachable to the flexible material's surface thereby enabling the flexible material to be secured about the container's open end.

BACKGROUND OF THE INVENTION

Liners for containers are well known in the art. Typically, containers comprise a plurality of different shapes and sizes. The container may be round, square, oval or any desired geometric configuration. The containers generally have one end open and the opposite dosed end. The container may taper from one end to the other end.

Typically, the liners for containers are flexible, biodegradable or non-biodegradable. Typically, the flexible liners are made from polymer materials that are easily folded for convenient storage. Generally, the flexible liners are manufactured in a narrow range of sizes i.e., 10, 20, or 50 gallon capacity. The containers are manufactured in a variety of shapes and sizes. Only a limited quantity of containers are manufactured in the 10, 20, or 50 gallon capacity range. A liner placed inside a container that is smaller than the capacity of the liner results in the generation of excess liner material. The excess material allows the liner to fit loosely within the confines of the container. The loose fit of the liner to the container causes the liner to recede into the interior of the container when objects are placed in the liner.

In the past, attempts were made to accommodate the excess material by securing the excess material about the container. An example of that attempt is container 50, FIG. 4. The container 50 has liner 51 positioned to receive articles. A double-sided adhesive tape 52 with both sides of the tape having adhesive areas is provided. One of the adhesive sides has a protective covering disposed thereon. The other adhesive side is affixed to a portion of the outer surface 53 of the liner 51. The liner 51 is placed within the confines of the container 50 in such a way that a portion of the liner 51 with the double-sided adhesive tape 52 is extending outwardly from the container 50. The second protective covering is removed from the covered side of the tape 52. The excess material of the liner 51 is grasped by the user in such a way as to adjoin the second adhesive side of the double-sided adhesive tape 52 together supposedly tightening the liner 53 about the container's 50 open end.

The complications of grasping the excess material in this manner and applying the double-sided adhesive tape (as discussed above) is that the length of the double-sided adhesive tape must equal the length of the excess material. If the length of the excess material is greater than the length of the double-sided adhesive tape, the liner will remain loose about the container's open end. If the length of the excess material is smaller than the length of the double-sided adhesive tape the liner will stretch and possibly be torn. If the length of the excess material is equal to the length of the double-sided adhesive tape, the liner may be secured depending on the user's skill and repetitive practice. During this process, the exact amount of excess material to be folded and secured by the length of the double-sided adhesive tape remains hidden from the user thus further complicating the process. Containers that are tapered change diameter from one end to the other. Depending on the length of the liner and the height of the container the liner may or may not tighten about the open end of the container. Gathering together the excess material of the liner while attempting to keep the adhesive side of the double-sided adhesive tape separated requires a second user. The first user positions the double-sided adhesive tape on the liner and keeps the excess material from being entangled with the double-sided adhesive tape. The second user gathers the excess material together while coordinating activities with the first user.

It would be desirable for any size liner to fit within the confines of a container with the top portion of the liner secured about the open end of the container. A single user would apply the securing mechanism. The securing mechanism would be visible to the user while application of securing the liner about the open end of the container.

SUMMARY OF THE INVENTION

The preferred embodiment of the present invention secures flexible material about the open end of a container. The preferred embodiment of the present invention is a single user operated securing mechanism that is visible to the user while securing the flexible material about the open end of a container. A portion of the flexible material, positioned about the open end of the container, is folded in a single or in a plurality of layers. Folding the layered portion tightens the flexible material about the container's open end. The folded portion is positioned adjacent to the un-folded portion of the flexible material.

The securing mechanism is a single-sided adhesive tape having a portion thereof pre-attached to the folded portion of the flexible material. The remaining unattached portion of the single-sided adhesive tape has a protective covering disposed thereon. The protective covering is removed and adjoined to the un-folded portion of the flexible material. The single user securing the flexible material about the open end of the container has the securing mechanism in view during the securing operation.

The second embodiment of the present invention reinforces the flexible material along one edge of the flexible material. The reinforced area disposed on the flexible material comprises at least one overlying portion that is secured to the flexible material thereby forming a reinforced area of the flexible material. The reinforced area contains the securing mechanism. When securing the flexible material about the open end of the container the reinforced area prevents inadvertent tearing or ripping of the flexible material.

When taken in conjunction with the accompanying drawings and the appended claims, other features and advantages of the present invention become apparent upon reading the following detailed description of embodiments of the invention.

BRIEF DESCRIPTION OF THE DRAWINGS

The invention is illustrated in the drawings in which like reference characters designate the same or similar parts throughout the figures of which:

FIG. 1 illustrates a perspective view schematic diagram of the preferred embodiment the present invention, FIG. 2 illustrates a side view schematic diagram of the preferred embodiment of the present invention of FIG. 1, FIG. 3 illustrates a side view schematic diagram of the preferred embodiment of the present invention applied to a flexible material of FIG. 2.

DETAILED DESCRIPTION OF THE INVENTION

Figure 4:
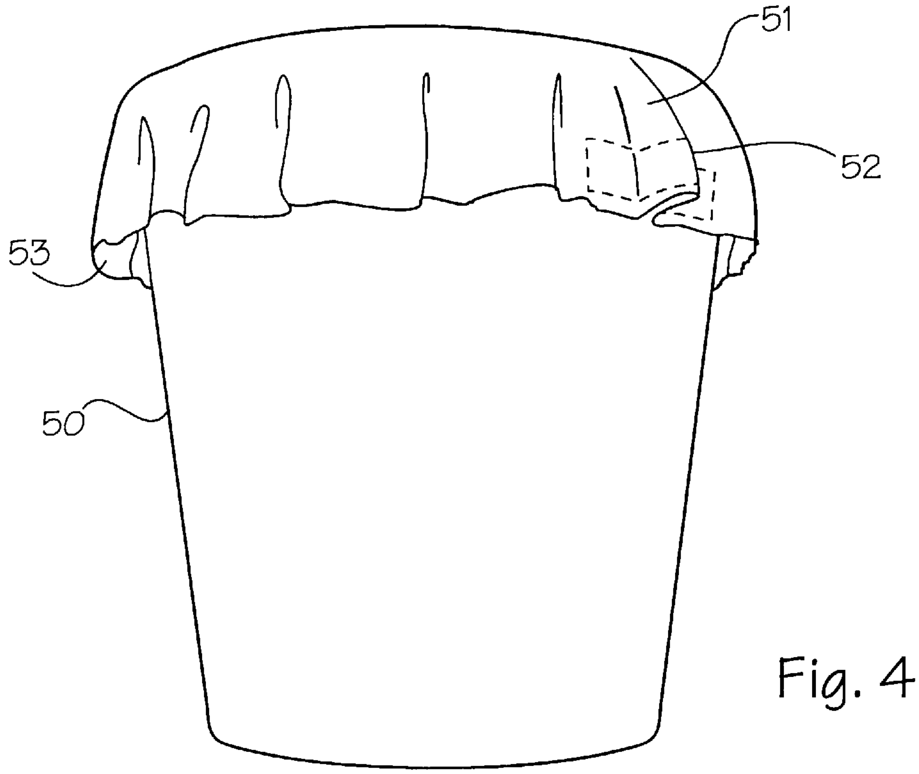
FIG. 4 illustrates a side view schematic diagram of the prior art.

An overview of the preferred embodiment of the present invention: The preferred embodiment of the present invention 10, FIG. 1 is a method for securing a flexible material 11 about a container 12. The flexible material 11 is secured in-place by a single-sided adhesive tape 13 with a protective covering disposed over the adhesive portion. The single-sided adhesive tape 13 may, if desired, be disposed in a pre-attached position along the inner surface 14 of the flexible material 11. The single-sided adhesive tape 13 in concert with the flexible material 11 secures the flexible material 11 about the container 12.

A more detailed discussion of the preferred embodiment of the present invention 10: The container 12, FIG. 1 may, if desired, be any type of container with one end open. The physical geometry of the container 12 may, if desired, be any convenient geometry known in the art. Examples of various types of container 12 geometries that are used in concert with the preferred embodiment of the present invention 10 are substantially rectangular, oval, square and various types of geometries that are derivations of the aforementioned geometrical shapes.

The flexible material 11, FIG. 1 may, if desired, be any convenient type of chemical or non-chemical compound known in the art to yield flexible material. The material 11 may, if desired, be molded, preformed, cast, rolled, or fitted to produce the desired geometric shape of the flexible material 11. Examples of flexible materials 11 are plastic, vinyl or any polymer derived material. The thickness of the flexible material 11 may, if desired, be selected from a range of thickness from about 0.001 to 1.0 mils. The flexible material 11 may, if desired, be folded into a substantially rectangular shape with two of the four sides of the flexible material 11 being joined or affixed in a manner to secure the open end about the open end of the container 12. The flexible material 11 conforms to any geometric shape adjacently spaced thereto. Examples of flexible material 11 conforming to any geometric shape are a round geometric shape 15, FIG. 3 and the substantially rectangular container 12, FIG. 1. The folded and adjoined flexible material 11 has one end open for the deposit of selected articles that may, if desired, be placed within the confines of the folded and adjoined flexible material 11. The folded and adjoined flexible material 11 yields a malleable type of container that is formed into various distinctive geometries depending on the contents of the folded and adjoined flexible material 11 and the geometry of container 12.

The single-sided adhesive tape 13, FIG. 1 may, if desired, be any convenient type of single-sided adhesive tape known in the art. The single-sided adhesive tape 13 may, if desired, have any desired physical geometry. Examples of various types of single-sided adhesive tape 13 geometries that are used in concert with the preferred embodiment of the present invention 10 are substantially rectangular, oval, square and various types of geometries that are derivations of the aforementioned geometrical shapes.

The preferred single-sided adhesive tape 13 has a substantially elongated rectangular geometric shape. The thickness of the tape may, if desired, be in the range of 0.01 mils to about 500 mils. Preferably, the thickness of the single-sided tape 13 is about 0.1 mils. The adhesive strength of the adhesive coating 16 may be any convenient strength suitable for the intended purpose of affixing and holding itself to the intended surface. If desired, the single-sided adhesive tape 13 may be pre-attached along the top portion 9 of the inner surface 14 of the flexible material 11. A protective covering 17 is placed over the adhesive coating 16. The protective covering 17 has properties that permit only limited adhesion to the adhesive coating 16. The limited adhesion permits the removing of the protective covering 17 from the adhesive coating 16 without the removal of a substantial portion of the adhesive coating 16.

In operation, the flexible material 11, FIG. 1 is placed within the confines of the container 12. The outer surface of the flexible material 11 is contiguous with the inner surface of the container 12. The inner surface 14 of the flexible material 11 is inwardly facing with respect to the interior of the flexible material 1. A selected portion of the flexible material 11 extends over the rim 18 of the container 12. The portion of the flexible material 11 that is selected to extend over the rim 18 of container 12 may be any desired length. The determining factor in selecting the appropriate length depends on the relative size of the container's 12 open end from which the flexible material 11 extends. For example, the flexible material's 11 two adjoined and folded sides form a substantially rectangular geometric shape. The unadjoined fourth side extends over the rim 18 of container 12. If the opening of flexible material 11 is larger than the container's 12 opening, an excess amount of flexible material 11 is generated.

The excess material generated in the aforementioned example may, if desired, be folded in layers i.e., a first portion of the of the excess material is folded end over end forming a two ply fold from the excess flexible material 11, FIG. 1. If desired, the user 19 of the preferred embodiment of the present invention 10 may fold the excess material about its middle forming a four-ply fold. The user may, if desired, fold the excess flexible material 11 into a plurality of individual convenient folds. The folding of the excess material tightens the flexible material 11 about the open end of the container 12.

In one application of the preferred embodiment of the present invention 10 the single-sided adhesive tape 13, FIG. 1 is separated from the flexible material 11. The user 19, FIG. 1 peels a selected portion of the protective covering 17 from the single-sided adhesive tape 13. The user 19 places the adhesive side of the single-sided adhesive tape 13 against the pre-folded area of the flexible material 11. The user 19 removes the remaining portion of the protective covering 17 from the single-sided adhesive tape 13. The user 19 places the newly exposed adhesive area against the unfolded portion of the inner surface of the flexible material 11, thereby securing the flexible material 11 about the container's 12 open end.

In one application of the preferred embodiment of the present invention 10 the single-sided adhesive tape 13, FIG. 1 has a portion thereof pre-attached to the flexible material's 11 pre-folded area (as discussed above). The user 19 removes the protective covering 17 from the single-sided adhesive tape 13 and places the newly exposed adhesive area against the unfolded portion of the inner surface of the flexible material 11, thereby securing the flexible material 11 about the container's 12 open end.

The flexible material 11, container 12 and the single-sided adhesive tape 13 may be used in concert to tightly secure the flexible material 11 about the open end of any container 12.

For example the container 12, FIG. 2 has a circular open-end versus the rectangular opening of container 12, FIG. 1. Utilizing either application (as discussed above) the flexible material 11 is tightly secured about the container 12 by the single-sided adhesive tape 13 discussed herein.

Figure 5:
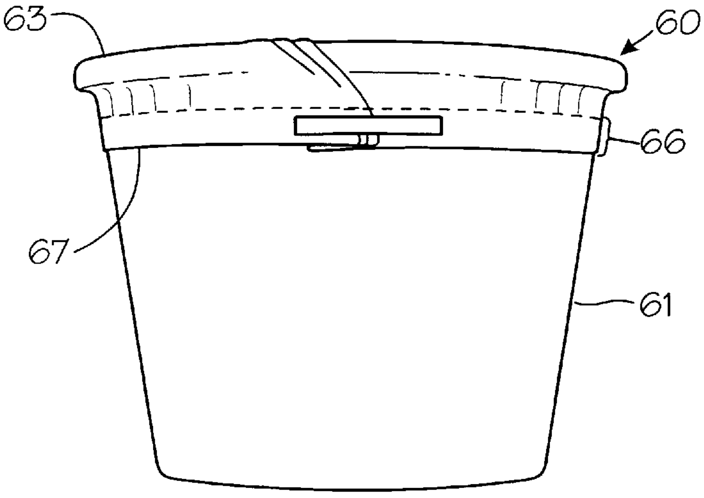
FIG. 5 illustrates a side view schematic diagram of the second embodiment of the present invention.

The second embodiment of the present invention is generally illustrated at 60, FIG. 5. The second embodiment of the present invention 60 is a reinforcement apparatus 62, FIG. 6 for a container 61. The container 61 may, if desired, be fabricated from the same or different materials and the same or different geometric configuration as the container 12 discussed in the preferred embodiment of the present invention 10.

Figure 6:
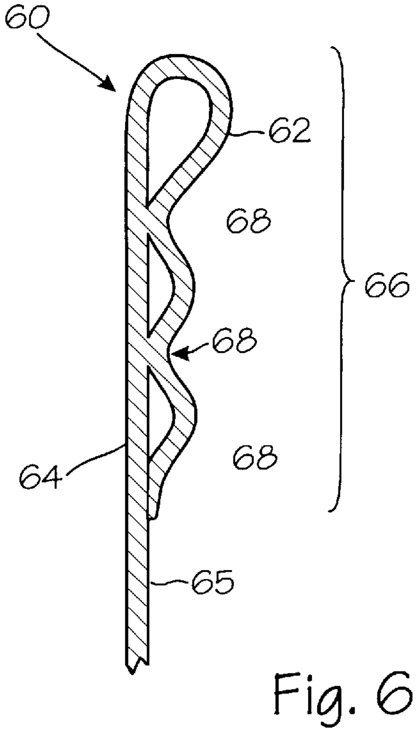
FIG. 6 illustrates a partial cross-sectional schematic diagram of FIG. 5.

The reinforcement apparatus 62, FIG. 6 is formed from a substantially rectangular flexible material 63. The flexible material 63 may, if desired, be fabricated from the same or different materials and the same or different geometric configurations as the flexible material 11 discussed in the preferred embodiment of the present invention 10. The flexible material 63 has a top surface 65 and a bottom surface 64. A selected portion 66 of the flexible material 63 is folded along one long side in an overlying arrangement causing the selected portion's 66 top surface 65 to be contiguous with a second portion of the top surface 65. The selected folded portion 66 is spaced from the edge 67, FIG. 5 of the rectangular flexible material 63. The flexible material's 63 selected top portion 66 may, if desired, be any convenient segment of the flexible material 63. Preferably, the selected folded portion 66 is in the range of ½ inch to about 4 inches. The folded portion 66 is affixed to the top surface 65 by any convenient sealing treatment. The intersection 68 of the selected folded portion 66 and the flexible material 63 has sufficient heat applied to interstitially bond one surface to the other surface. If desired a plurality of sealing treatments may be applied to folded portion 66 to further strengthen the bond between folded the portion 66. The folded portion 66 is sealed thereby forming a reinforced container for articles. An example of a sealing treatment is heat-sealing.

The method of securing the flexible material 11, FIG. 1 about the container discussed in the preferred embodiment of the present invention 10, FIG. 1 may, if desired, be applied to the second embodiment of the present invention 60. The application of the preferred embodiment of the present invention 10 to the second embodiment of the present invention 60 is conducted in the same manner as discussed above.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. Means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

I claim:

1. A method for securing a flexible material about a container with single-sided adhesive tape with a portion of the adhesive side of the tape having a protective cover attached thereto, the flexible material having an inner and outer surface, the container having one end open, the flexible material outer surface contiguous with the inner surface of the container, a portion of the flexible material extending over the container's open end in such a way that enables a portion of the flexible material's outer surface to be contiguous to the container's outer surface, comprising the steps of:

a) pre-attaching the exposed adhesive portion of the single-sided adhesive tape to the inner surface of the flexible material;

b) grasping a selected portion of flexible material extending over the container's open end;

c) folding said selected portion of flexible material;

d) drawing together said folded portion about the container's open end in such a way as to tighten the flexible- material's outer surface against the container's outer surface;

e) removing the protective covering from the single-sided adhesive tape;

f) adjoining said single-sided adhesive tape's adhesive surface to the flexible material's inner surface spaced from said adjoined folded portion;

thereby the flexible material is secured about the container's open end via the single-sided adhesive tape adjoining said folded portion to the flexible material's inner surface.

2. A method for securing as recited in claim 1 wherein said step of grasping a portion of flexible material extending over the container's open end comprises the step of gathering together excess flexible material.

3. A method for securing as recited in claim 2 wherein said step of folding a portion of said grasped portion comprises the steps of:

a) elongating said gathered together excess flexible material forming a two ply fold; and b) layering said two ply fold.

* * * * *